Feb. 7, 1928.

H. D. BUDDE 1,658,038

LIQUID METER

Filed Sept. 10. 1923

2 Sheets-Sheet 2

INVENTOR
HARRY D. BUDDE

BY E.E.Hugoman
ATTORNEY

Patented Feb. 7, 1928.

1,658,038

UNITED STATES PATENT OFFICE.

HARRY D. BUDDE, OF ST. LOUIS, MISSOURI.

LIQUID METER.

Application filed September 10, 1923. Serial No. 661,772.

My invention relates to a liquid meter and particularly to a meter adapted to measure the amount of fuel used by an internal combustion engine such as is used for driving motor vehicles. The registering mechanism of my device is provided not only with a primary indicator to show the total amount of fuel used over a considerable period of time, but also with a secondary or subtraction indicator by means of which the amount of fuel in the supply tank is at all times shown.

The object of my invention is to provide improved electrical means for operating the valves of the measuring chamber of the device. The measuring float is thus relieved of all work except opening and closing the circuits controlling the valves, and consequently not only the accuracy but also the reliability of the device is greatly increased.

Figure 1:
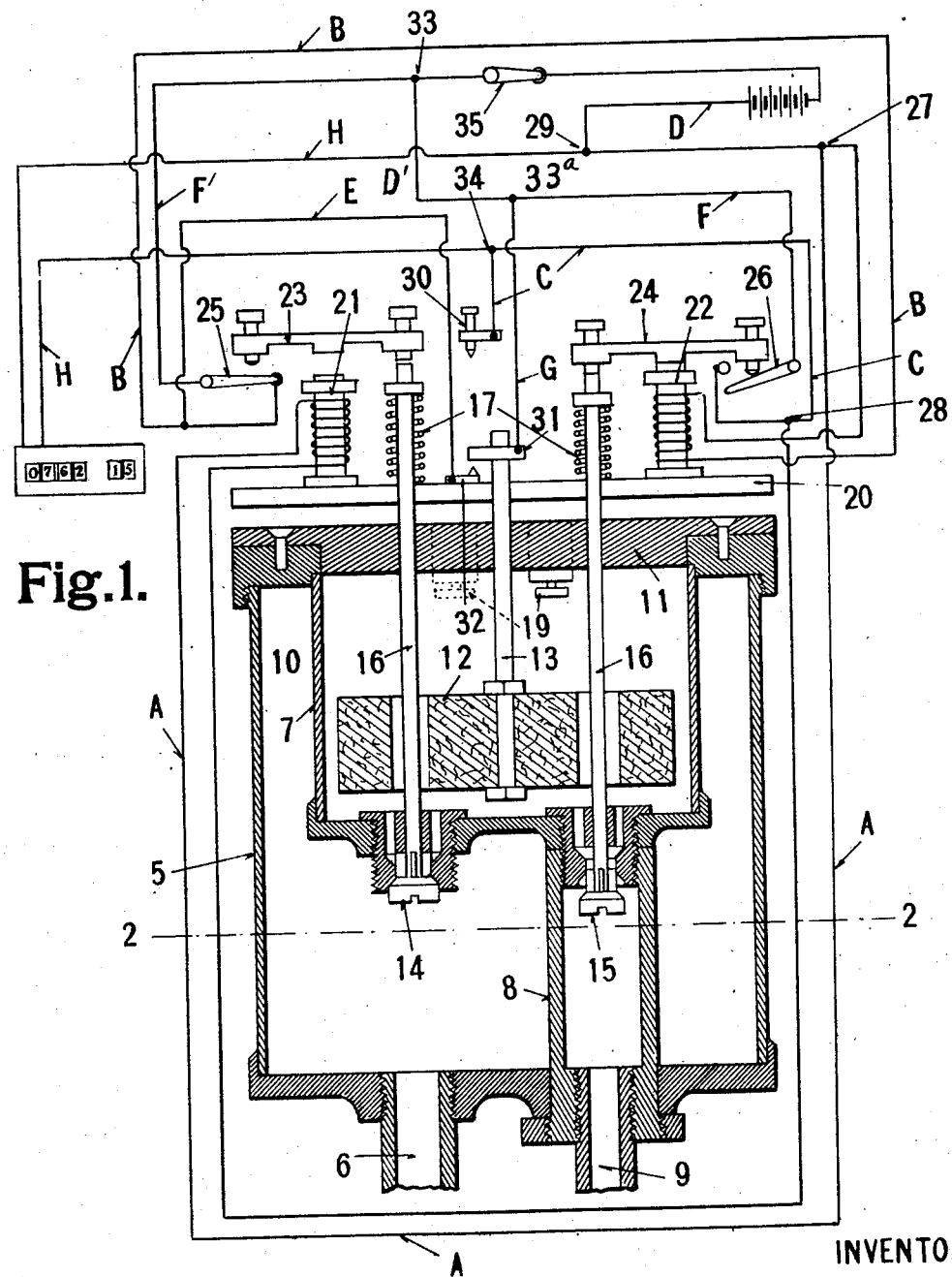
Figure 2:
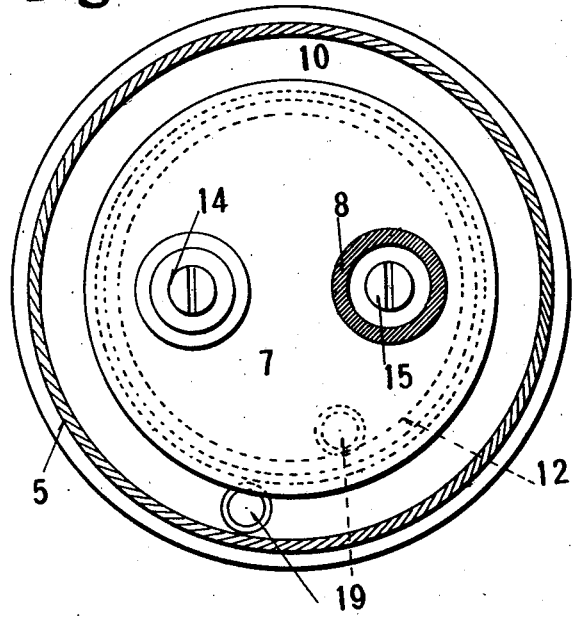
Figure 3:
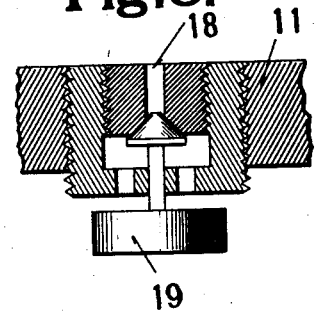
Figure 4:
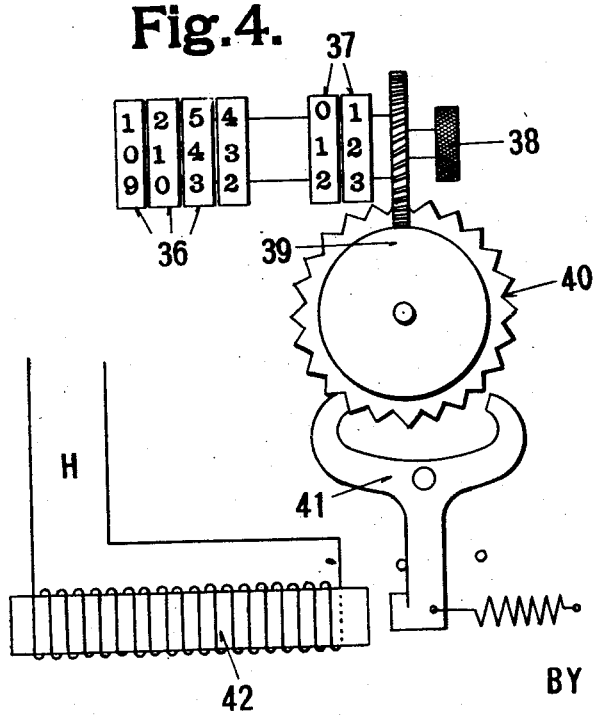

In the accompanying drawings which illustrate one form of liquid meter made in accordance with my invention Figure 1 is partly a vertical section and partly a diagram; Figure 2 is a section taken on the line 2—2 of Figure 1; Figure 3 is an enlarged sectional view of one of the vent valves; and Figure 4 is a diagrammatic view of the registering mechanism.

The numeral 5 indicates the outer chamber of the measuring device which is preferably cylindrical in form and is provided with a discharge pipe 6 leading to the carburetor (not shown). Within the chamber 5 the measuring chamber 7 is supported on a sleeve 8 forming an extension of the inlet pipe 9 from the fuel tank (not shown). For convenience in construction the cover of the measuring device consists of two parts, an annular member 10 and a flanged disc 11. Within the chamber 7 is the measuring float 12 secured to a stem 13 which controls the electrical circuits, as will be hereinafter described. Carried in the bottom of the chamber 7 are a pair of downwardly opening valves 14 and 15 respectively. The valve 14 operates into the chamber 5 and functions as a discharge valve while the valve 15 opens into the extension 8 of the supply pipe and functions as an inlet valve. Valve stems 16 passing through the disc 11 carry the valves 14 and 15 and normally hold them in closed position by means of light coil springs 17. The chambers 5 and 7 are each provided with a vent 18 (Fig. 3) which is normally open to allow the passage of air into and out of the chamber but is adapted to be closed by a float valve 19, shown in detail in Figure 3, if through any failure of the apparatus to properly function, the chamber becomes completely full of gasoline.

Carried a short distance above the top of the measuring chamber, by any suitable means (not shown) is a support 20 upon which is mounted the electrical controlling devices. 21 and 22 are electromagnets provided with armatures 23 and 24 respectively, each having a pair of adjustable contact points. One of the contact points of the armature 23 is adapted to strike the end of the valve stem 16 carrying the valve 14 and thus open the said valve, while the other is adapted to open a switch 25. In like manner the armature 24 controls the valve 15 and a switch 26. It will be understood that the armatures 23 and 24 and the switches 25 and 26 are returned to normal position by any suitable means, such as springs (not shown).

The winding of the magnet 21 forms part of an electric circuit A, the ends of which are connected at points 27 and 28 to the battery circuit D and switch circuit C. The switch 26 is in circuit with the magnet 21. The circuit B includes the winding of the magnet 22 and has one end connected at point 27 with the battery circuit D and the other to one terminal of the switch 25 through switch circuit E. Switch 25 is in circuit with the magnet 22. The circuit C is connected at one end to one terminal of the switch 26, and at the other to an adjustable contact 30. The circuit E is connected at one end to one terminal of the switch 25, and at the other to contact 32. The remaining contacts of the switches 25 and 26 are connected by circuits F and F' at points 33$^a$ and 33 to conductor D'. A branch circuit G connects the movable contact 31, attached to the float, with the battery circuit D'. A circuit H, controlling the registering mechanism, connects to battery circuit D at point 29 and at point 34 to circuit C to contact 30. A manually operated switch 35 is preferably placed in the battery circuit, D and D' to cut out the battery when the device is not in use.

The registering device, shown diagramatically in Figure 4, comprises two sets of registering wheels 36 and 37. The wheels 36 form the totalizing register and preferably record in gallons, while the wheels 37 preferably record in gallons and tenths of gallons and have their numerals arranged in reverse order from those of the wheels 36 so as to subtract while the latter are adding. The wheels 37 may be manually set forward by a milled head 38 without disturbing the wheels 36 each time fuel is fed into the tanks, so that the amount indicated by the wheels 37 will at all times indicate the amount of fuel in the tanks. The wheels 36 and 37 are driven by gearing 39 controlled by an escapement wheel 40 and pawl 41, the latter being actuated by a magnet 42 the winding of which forms part of the circuit H hereinbefore described.

The operation of my device is as follows; assuming the measuring chamber 7 to be empty, the float 12 will be at the bottom of said chamber causing contact 31 to come against the contact 32. Current will now flow from the battery through closed switch 35 into battery circuit D' and branch G across contacts 31 and 32 into switch circuit E, thence to circuit B including the magnet winding 22 and back to battery through battery circuit D at point 27. This will cause the magnet 22 to draw down its armature 24, as shown in Figure 1, opening the inlet valve 15, and also opening the switch 26 which is in the circuit of magnet 21, thereby allowing liquid to flow through open valve 15 into measuring chamber 7, and not allowing any current to flow through magnet 21 through the open switch 26. As the fuel fills the measuring chamber 7 the float 12 will rise, breaking the contact between 31 and 32. During the operation valve 14 and switch 25 remain closed. When contacts 31 and 32 are broken by the rising float, current will continue to flow through magnet 22 by way of circuit F' through closed switch 25 into circuit B including magnet 22 back to battery through circuit D. This operation will keep magnet 22 energized, which will hold down its armature 24, thereby keeping valve 15 and switch 26 open. As the float rises to its predetermined level, contact 31 attached to float 12 will strike contact 30 allowing current from battery to flow through circuit D' and branch circuit G across contacts 31 and 30 into switch circuit C, thence to circuit A including the magnet winding 21 and back to battery through battery circuit D at point 27. This will cause the magnet 21 to draw down its armature 23 opening the outlet valve 14, and also opening the switch 25 which is in the circuit of magnet 22. As the opening of switch 25 takes place, current is cut off from magnet 22 allowing armature 24 to disengage; and valve 15 will close, and switch 26 closes to continue allowing current to flow through magnet 21. The outlet valve 14 now being open the fluid will flow into chamber 5, thence to carburetor. As the fluid flows from chamber 7 to chamber 5 the float 12 will fall, breaking contact 31 and 30, but current will continue to flow through magnet winding 21 to hold down armature 23, by way of battery circuit D' into circuit F through closed switch 26 into circuit A including magnet 21 and back to battery through circuit D. This operation will keep magnet 21 energized, which will hold down its armature 23, thereby keeping valve 14 and switch 25 open. The chamber 7 continues to empty and float 12 falls until contact 31 strikes contact 32, when the above described cycle of operation is repeated. Each time the float rises and contact 31 is made with 30, current flows from battery through circuit D' and branch G across contact 30 into circuit H, which includes magnet winding 42 of the registering mechanism. As the magnet 42 is energized it attracts an armature which drives a ratchet and pawl connected with proper gear ratio to counter wheels, registering each time chamber 7 is filled up.

Having fully described my invention, what I claim as new and desire to secure by Letters Patent of the United States is:

1. In a device of the class described, the combination with a measuring chamber provided with inlet and outlet openings, of a float therein, independently movable inlet and outlet valves for said openings, a pair of electro-magnets severally forming the sole control for said valves respectively, circuits including said electro-magnets, contact controlling means operated by the float, and a pair of switches, each controlled by one of the electro-magnets, whereby the operation of a valve is dependent on the combined action of the float and switches.

2. In a device of the class described, the combination with a measuring chamber provided with inlet and outlet openings, of a float therein, independently movable inlet and outlet valves for said openings, a pair of electromagnets severally forming the sole control of said valves, circuits including said electro-magnets, switches in said circuits, an armature for each magnet controlling one of said switches, and circuit controls operated by the float, whereby the operation of the valves is dependent on the combined action of the valves and switches.

3. In a device of the class described, the combination with a measuring chamber provided with inlet and outlet openings, of a float therein, circuit opening and closing means operated by said float, independently movable inlet and outlet valves for said openings, yielding means for each valve normally holding it in one position, a pair of electro-magnets forming the sole means for moving and holding said valves against said yielding means, a pair of switches each controlled by one of said electro-magnets, and circuits each independently controlled by the combined action of said float and one of said switches.

4. In a device of the class described, the combination with a measuring chamber provided with inlet and outlet openings, of a float therein, circuit opening and closing means operated by said float, a pair of independently movable valves for said openings, yielding means for each valve normally holding it in one position, a pair of electro-magnets for moving and holding said valves against said yielding means, circuits including said electromagnets, and a switch in the circuit of each magnet and controlled by the movement of the other magnet, each circuit being controlled by the combined action of the float and one of said switches.

5. In a device of the class described, the combination with a measuring chamber provided with inlet and outlet openings, of a float therein, circuit opening and closing means operated by said float, a pair of independently movable valves for said openings, springs for holding said valves in closed position, a pair of electro-magnets each provided with an armature adapted to open and hold one of said valves but movable independently of it, switches controlled by said electro-magnets, and circuits including said electro-magnets and controlled by the combined action of the float and one of the switches.

6. In a device of the class described, the combination with a measuring chamber provided with inlet and outlet openings, of a float therein, circuit opening and closing means operated by said float, a pair of independently movable valves for said openings, springs for holding said valves in closed position, a pair of electro-magnets each provided with an armature adapted to open and hold one of said valves but movable independently of it, circuits including said electromagnets, and a switch in each magnet circuit and controlled by the movement of the armature of the other magnet, each circuit controlled by the combined action of the float and one of the switches.

In testimony whereof, I have hereunto set my hand.

HARRY D. BUDDE.